US011697159B2

(12) United States Patent
Kobayashi et al.

(10) Patent No.: US 11,697,159 B2
(45) Date of Patent: Jul. 11, 2023

(54) THREE-DIMENSIONAL SHAPING DEVICE AND METHOD FOR MANUFACTURING THREE-DIMENSIONAL SHAPED OBJECT

(71) Applicant: Seiko Epson Corporation, Tokyo (JP)

(72) Inventors: Hiroki Kobayashi, Hara-Mura (JP); Kazuhide Nakamura, Asahi (JP); Koichi Saito, Matsumoto (JP)

(73) Assignee: SEIKO EPSON CORPORATION

( * ) Notice: Subject to any disclaimer, the term of this patent is extended or adjusted under 35 U.S.C. 154(b) by 43 days.

(21) Appl. No.: 17/104,073

(22) Filed: Nov. 25, 2020

(65) Prior Publication Data

US 2021/0154941 A1 May 27, 2021

(30) Foreign Application Priority Data

Nov. 27, 2019 (JP) .................................. 2019-214120

(51) Int. Cl.
  *B29C 64/393* (2017.01)
  *B33Y 50/02* (2015.01)
  (Continued)

(52) U.S. Cl.
  CPC .............. *B22F 12/53* (2021.01); *B22F 10/00* (2021.01); *B22F 12/52* (2021.01); *B22F 12/57* (2021.01);
  (Continued)

(58) Field of Classification Search
  CPC ... B29C 64/393; B29C 64/118; B29C 64/209; B22F 10/00; B33Y 30/00; B33Y 50/02
  See application file for complete search history.

(56) References Cited

U.S. PATENT DOCUMENTS

2016/0243765 A1  8/2016  Sasaki et al.
2016/0368214 A1  12/2016  Sasaki et al.
(Continued)

FOREIGN PATENT DOCUMENTS

JP        2009095740 A  *  5/2009
JP        2016-068334 A     5/2016
(Continued)

*Primary Examiner* — Timothy Kennedy
*Assistant Examiner* — Farah Taufiq
(74) *Attorney, Agent, or Firm* — Harness, Dickey & Pierce, P.L.C.

(57) ABSTRACT

A three-dimensional shaping device includes: a discharge unit configured to discharge a shaping material; a weight measuring unit configured to measure a weight of the shaping material discharged from the discharge unit; and a control unit configured to control the discharge unit and the weight measuring unit to shape a three-dimensional shaped object by stacking layers of the shaping material in a shaping region of a stage, in which the control unit is configured to control the weight measuring unit to measure the weight of the shaping material discharged from the discharge unit, determine whether a predetermined amount of the shaping material is discharged from the discharge unit based on the weight measured by the weight measuring unit, and when it is determined that the predetermined amount of the shaping material is not discharged, control the discharge unit so that the predetermined amount of the shaping material is discharged from the discharge unit.

4 Claims, 12 Drawing Sheets

(51) Int. Cl.
*B29C 64/209* (2017.01)
*B22F 12/53* (2021.01)
*B29C 64/118* (2017.01)
*B33Y 10/00* (2015.01)
*B33Y 30/00* (2015.01)
*B22F 10/00* (2021.01)
*B22F 12/52* (2021.01)
*B22F 12/57* (2021.01)
*B22F 12/90* (2021.01)
*B22F 10/18* (2021.01)
*B22F 10/22* (2021.01)

(52) U.S. Cl.
CPC ............ *B22F 12/90* (2021.01); *B29C 64/118* (2017.08); *B29C 64/209* (2017.08); *B29C 64/393* (2017.08); *B33Y 10/00* (2014.12); *B33Y 30/00* (2014.12); *B33Y 50/02* (2014.12); *B22F 10/18* (2021.01); *B22F 10/22* (2021.01)

(56) References Cited

U.S. PATENT DOCUMENTS

| | | | |
|---|---|---|---|
| 2017/0028646 A1* | 2/2017 | Sun | B33Y 99/00 |
| 2017/0165921 A1* | 6/2017 | Fetter | B33Y 50/02 |
| 2019/0030820 A1* | 1/2019 | Saito | B33Y 50/02 |

FOREIGN PATENT DOCUMENTS

| | | |
|---|---|---|
| JP | 2016-155362 A | 9/2016 |
| JP | 2017-007321 A | 1/2017 |
| JP | 2017-205965 A | 11/2017 |
| JP | 2018-051964 A | 4/2018 |

* cited by examiner

THREE-DIMENSIONAL SHAPING DEVICE AND METHOD FOR MANUFACTURING THREE-DIMENSIONAL SHAPED OBJECT

The present application is based on, and claims priority from JP Application Serial Number 2019-214120, filed Nov. 27, 2019, the disclosure of which is hereby incorporated by reference herein in its entirety.

BACKGROUND

1. Technical Field

The present disclosure relates to a three-dimensional shaping device and a method for manufacturing a three-dimensional shaped object.

2. Related Art

JP-A-2017-205965 discloses a device for manufacturing a three-dimensional shaped object, in which a film is formed by applying a liquid containing a solvent and a curable liquid material onto a shaping stage, a mass of the film on the shaping stage is measured, and an amount of liquid applied is adjusted in accordance with a change in the mass of the film.

In JP-A-2017-205965, by adjusting the amount of the liquid applied in accordance with the change in the mass of the film formed on the stage, an amount of the solvent in the film is adjusted to improve shaping accuracy of the film shaped as the three-dimensional shaped object. However, in a three-dimensional shaping device, an intended amount of material may not be discharged in the first place due to nozzle clogging, shaping environment, or the like. When the intended amount of material cannot be discharged, the shaping accuracy may be affected by generation of a gap in the shaped object, an increase in a line width of the material to be discharged, and the like.

SUMMARY

According to one aspect of the present disclosure, a three-dimensional shaping device is provided. The three-dimensional shaping device includes a discharge unit configured to discharge a shaping material; a weight measuring unit configured to measure a weight of the shaping material discharged from the discharge unit; and a control unit configured to control the discharge unit and the weight measuring unit to shape a three-dimensional shaped object by stacking layers of the shaping material in a shaping region of a stage. The control unit is configured to control the weight measuring unit to measure the weight of the shaping material discharged from the discharge unit, determine whether a predetermined amount of the shaping material is discharged from the discharge unit based on the weight measured by the weight measuring unit, and when it is determined that the predetermined amount of the shaping material is not discharged, control the discharge unit so that the predetermined amount of the shaping material is discharged from the discharge unit.

DESCRIPTION OF EXEMPLARY EMBODIMENTS

A. First Embodiment

Figure 1:
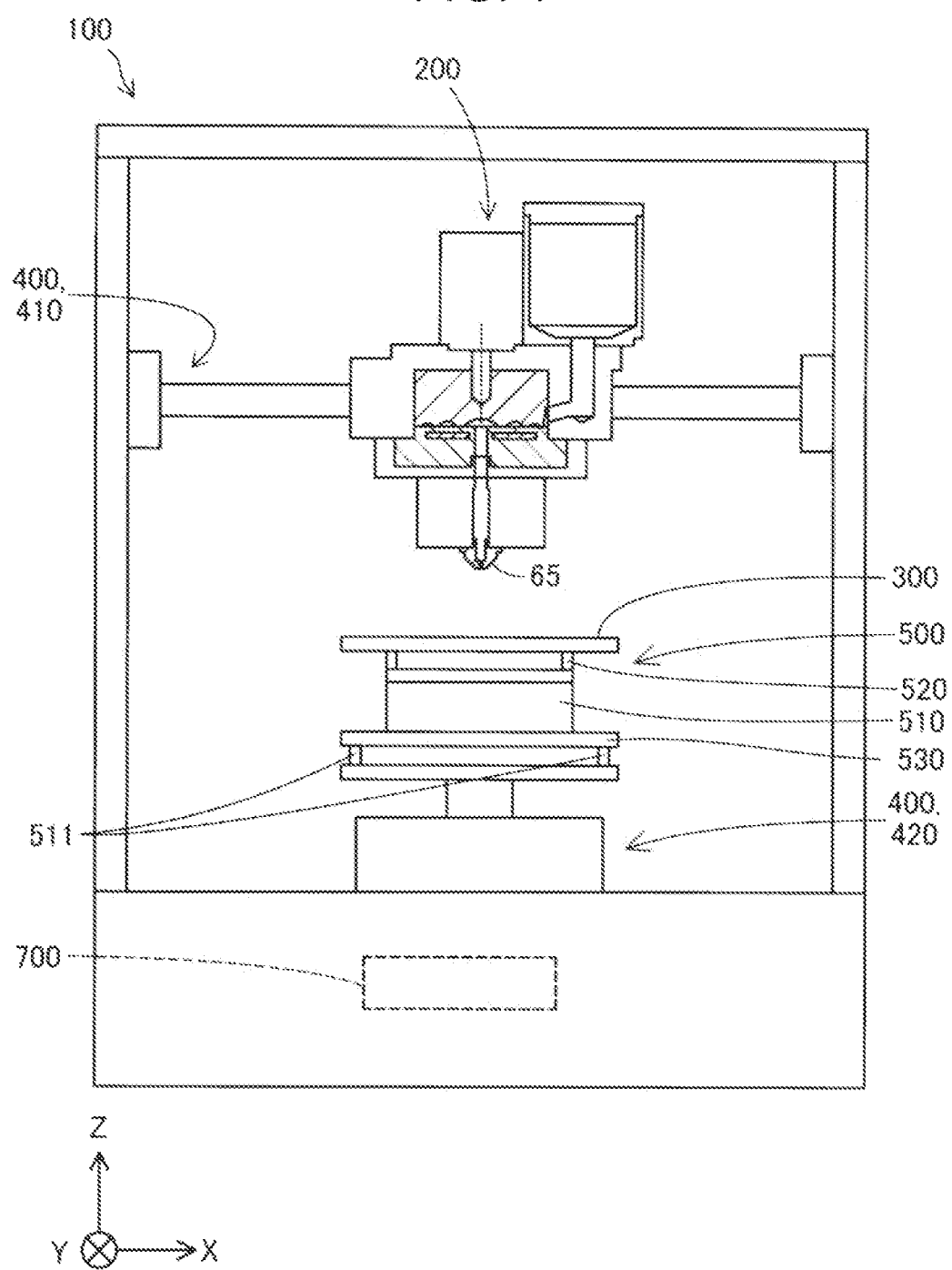
FIG. 1 is a diagram showing a schematic configuration of a three-dimensional shaping device according to a first embodiment.

FIG. 1 is a diagram showing a schematic configuration of a three-dimensional shaping device 100 according to a first embodiment. The three-dimensional shaping device 100 according to the present embodiment includes a discharge unit 200, a stage 300, a moving mechanism 400, a weight measuring unit 500, and a control unit 700. In the three-dimensional shaping device 100, under control of the control unit 700, a relative position of the discharge unit 200 and the stage 300 is changed by the moving mechanism 400 while a shaping material is discharged from the discharge unit 200 toward the stage 300, so that a three-dimensional shaped object having a desired shape is shaped on the stage 300. A detailed configuration of the discharge unit 200 will be described later.

In FIG. 1, arrows along X, Y, and Z directions which are orthogonal to each other are shown. The X, Y, and Z directions are directions along three spatial axes that are orthogonal to each other, that is, an X axis, a Y axis, and a Z axis, and include both one direction along the X axis, the Y axis, and the Z axis and an opposite direction. The X axis and the Y axis are axes along a horizontal plane, and the Z axis is an axis along a vertical line. In other figures, the arrows along the X, Y, and Z directions are appropriately shown. The X, Y, Z directions in FIG. 1 and the X, Y, Z directions in other figures represent the same direction respectively.

The moving mechanism 400 changes a relative position of the discharge unit 200 and the stage 300 three-dimensionally by moving the discharge unit 200 and the stage 300 separately. In the present embodiment, the moving mechanism 400 includes a first moving mechanism 410 that moves the discharge unit 200 and a second moving mechanism 420 that moves the stage 300. The first moving mechanism 410 is configured to move the discharge unit 200 in two axial directions of the X direction and the Y direction. The second moving mechanism 420 is configured to move the stage 300 in the Z direction. The first moving mechanism 410 and the second moving mechanism 420 move by drive force of respective motors that drive the mechanisms. Each motor is driven under the control of the control unit 700. In another embodiment, the relative position of the discharge unit 200 and the stage 300 may be changed by moving the stage 300 in three axis directions in the X, Y, and Z directions without moving the discharge unit 200. In addition, the relative position of the discharge unit 200 and the stage 300 may be changed by moving the discharge unit 200 in the three axis directions in the X, Y, and Z directions without moving the stage 300. A change in a relative position of the discharge unit 200 with respect to the stage 300 may be referred to as movement of the discharge unit 200.

In the present embodiment, the weight measuring unit 500 is provided below the stage 300, and supports the stage 300 from below the stage 300. The weight measuring unit 500 moves in the Z direction as the stage 300 is moved by the second moving mechanism 420. The weight measuring unit 500 measures a weight of the shaping material on the stage 300.

The weight measuring unit 500 of the present embodiment includes a weight sensor 510, a heat insulating unit 520, and a support unit 530. The support unit 530 is coupled to the second moving mechanism 420 and supports the weight sensor 510 from below. The support unit 530 includes screws 511. For example, when the weight sensor 510 or the stage 300 positioned above the support unit 530 is inclined with respect to an XY plane, a user can correct the inclination by rotating the screw 511. The weight sensor 510 is a load cell type weight sensor and measures the weight of the shaping material on the stage 300. The heat insulating unit 520 couples to the weight sensor 510 and the stage 300. The heat insulating unit 520 supports the stage 300 from below and prevents heat transfer from the stage 300 to the weight sensor 510. In another embodiment, the weight sensor 510 may be a weight sensor other than the load cell type. For example, an electromagnetic force balance type or a metal tuning fork type may be used.

The control unit 700 is implemented by a computer including one or more processors, a main storage device, and an input and output interface for inputting and outputting signals to and from the outside. In the present embodiment, the control unit 700 performs various functions by the processor executing a program or a command read in the main storage device. The control unit 700 may be implemented by a combination of a plurality of circuits instead of the computer.

Figure 2:
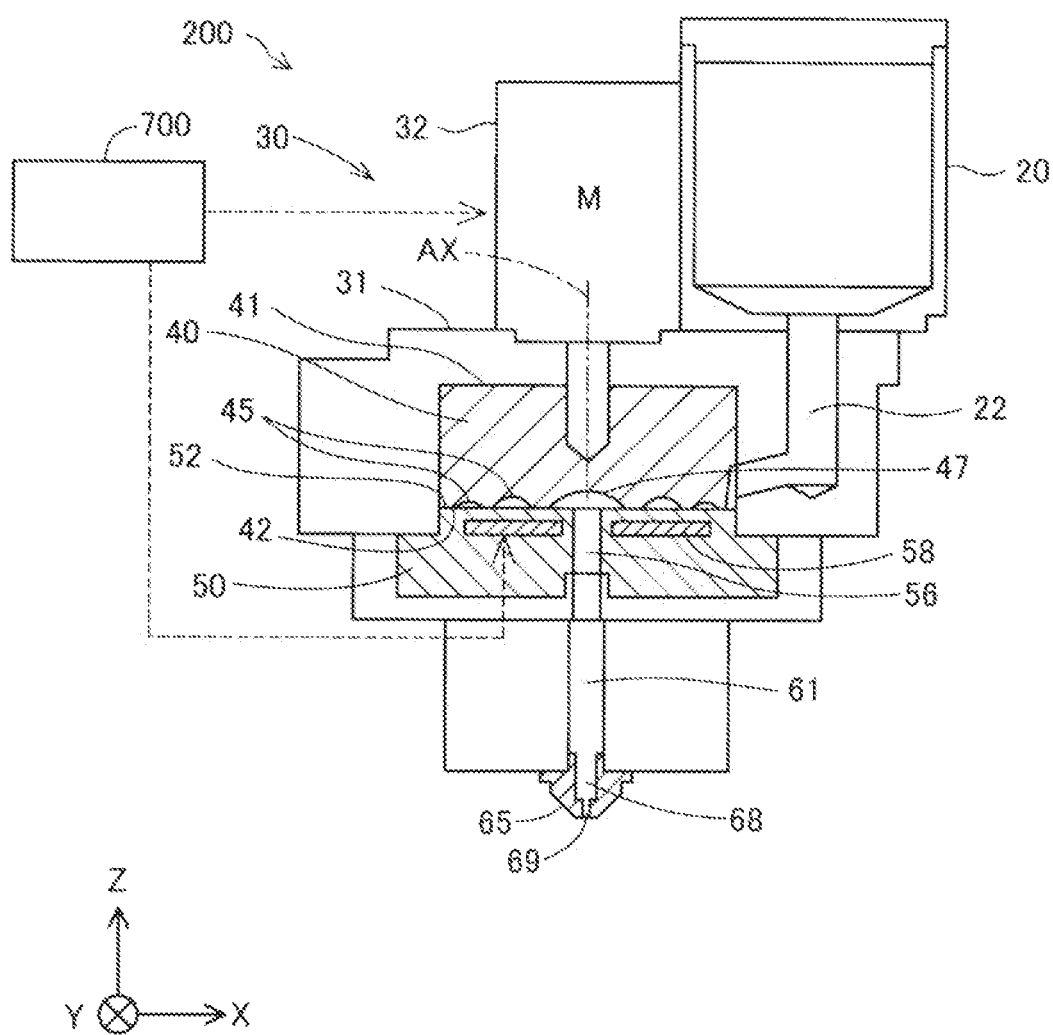
FIG. 2 is a diagram showing a schematic configuration of a discharge unit according to the present embodiment.

FIG. 2 is a diagram showing a schematic configuration of the discharge unit 200 according to the present embodiment. The discharge unit 200 in the present embodiment includes a material supply unit 20, a plasticization unit 30, and a nozzle 65.

A material in a state of pellets, powder, or the like is accommodated in the material supply unit 20. In the present embodiment, a pellet-shaped resin is used as the material. The material supply unit 20 according to the present embodiment is implemented by a hopper. Below the material supply unit 20, a supply path 22 that couples the material supply unit 20 and the plasticization unit 30 is provided. The material supply unit 20 supplies the material to the plasticization unit 30 via the supply path 22. Details of the material will be described later.

The plasticization unit 30 includes a screw case 31, a drive motor 32, a flat screw 40, and a barrel 50. The plasticization unit 30 melts at least a part of a solid-state material supplied from the material supply unit 20, generates a shaping material in a form of paste having fluidity, and supplies the generated shaping material to the nozzle 65. The term "melt" means not only that a material having thermoplasticity is heated to a temperature equal to or higher than a melting point to become a liquid, but also "plasticization", that is, the material having thermoplasticity is softened by being heated to a temperature equal to or higher than a glass transition point, and fluidity thereof is exhibited.

The screw case 31 is a case for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation shaft of the drive motor 32 is coupled to the flat screw 40 on an upper surface 41 side.

The drive motor 32 is driven under the control of the control unit 700. A rotation speed of the flat screw is controlled by controlling the drive motor 32. An amount of the shaping material discharged from the discharge unit 200 is adjusted by controlling the rotation speed of the flat screw 40. Specifically, when the rotation speed of the flat screw 40 increases, the amount of the shaping material discharged from the discharge unit 200 increases. When the rotation speed of the flat screw 40 decreases, the amount of the shaping material discharged from the discharge unit 200 decreases.

The flat screw 40 has a substantially columnar shape whose height in a direction along a central axis RX is smaller than a diameter of the flat screw 40. The flat screw 40 is disposed in the screw case 31 such that the central axis RX is parallel to the Z direction. The flat screw 40 rotates around the central axis RX in the screw case 31 due to a torque generated by the drive motor 32. The flat screw 40 includes a groove forming surface 42 at which a groove portion 45 is formed on a side opposite to an upper surface 41 in the direction along the central axis RX. A specific configuration of the flat screw 40 on a groove forming surface 42 side will be described later.

The barrel 50 is disposed below the flat screw 40. The barrel 50 includes a screw facing surface 52 that faces the groove forming surface 42 of the flat screw 40. The barrel 50 is provided with a communication hole 56 that communicates with the nozzle 65 on the central axis RX of the flat screw 40. A heater 58 is built in the barrel 50 at a position facing the groove portion 45 of the flat screw 40. A temperature of the heater 58 is controlled by the control unit 700. A specific configuration of the barrel 50 on a screw facing surface 52 side will be described later.

The nozzle 65 is disposed below the barrel 50. Between the nozzle 65 and the communication hole 56 provided in the barrel 50, a supply flow path 61 that is a flow path that makes the nozzle 65 communicate with the communication hole 56 is provided. The shaping material generated by the plasticization unit 30 is supplied to the nozzle 65 via the communication hole 56 and the supply flow path 61.

The nozzle 65 is provided with a nozzle flow path 68 and a nozzle hole 69. The nozzle flow path 68 is a flow path provided in the nozzle 65. The nozzle flow path 68 is coupled to the supply flow path 61. The nozzle hole 69 is a portion in which a flow path cross section provided at an end portion on a side of the nozzle flow path 68 communicating with atmosphere is reduced. The shaping material supplied to the nozzle flow path 68 from the supply flow path 61 is discharged from the nozzle hole 69. In the present embodiment, an opening shape of the nozzle hole 69 is a circle. The opening shape of the nozzle hole 69 is not limited to a circle, and may be, for example, a quadrangle or a polygon other than the quadrangle.

Figure 3:
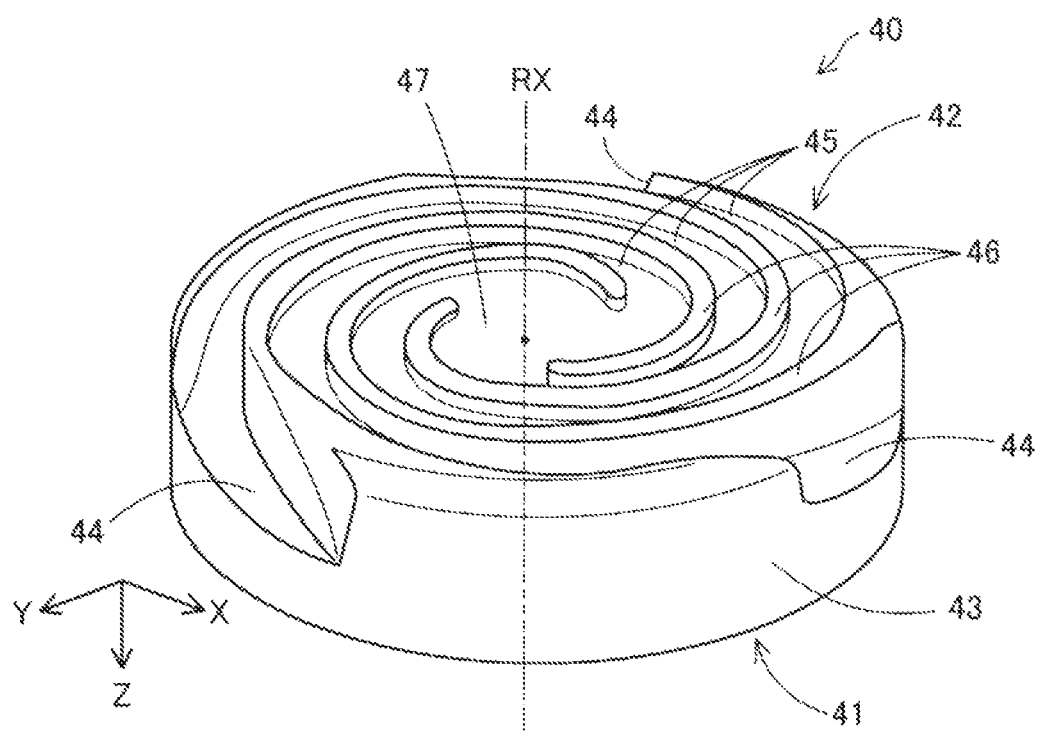
FIG. 3 is a schematic perspective view showing a configuration of a flat screw on a groove forming surface side.

FIG. 3 is a schematic perspective view showing the configuration of the flat screw 40 on the groove forming surface 42 side. In FIG. 3, a position of the central axis RX of the flat screw 40 is shown by a dashed line. As described with reference to FIG. 2, the groove portion 45 is provided in the groove forming surface 42.

A central portion 47 of the groove forming surface 42 of the flat screw 40 is implemented as a recess to which one end of the groove portion 45 is coupled. The central portion 47 faces the communication hole 56 of the barrel 50 shown in FIG. 2. The central portion 47 intersects the central axis RX.

The groove portion 45 of the flat screw 40 forms a so-called scroll groove. The groove portion 45 extends spirally from the central portion 47 toward an outer periphery of the flat screw 40 so as to draw an arc. The groove portion 45 may extend spirally. The groove forming surface 42 is provided with a ridge portion 46 that forms a side wall portion of the groove portion 45 and extends along the groove portion 45.

The groove portion 45 extends to a material introduction port 44 formed in a side surface 43 of the flat screw 40. The material introduction port 44 is a portion at which the material supplied via the supply path 22 of the material supply unit 20 is received.

FIG. 3 shows an example of the flat screw 40 including three groove portions 45 and three ridge portions 46. The number of the groove portions 45 or the ridge portions 46 provided on the flat screw 40 is not limited to three. The flat screw 40 may be provided with only one groove portion 45, or may be provided with two or more groove portions 45. Any number of the ridge portions 46 may be provided in accordance with the number of the groove portions 45.

FIG. 3 illustrates an example of the flat screw 40 in which the material introduction ports 44 are formed at three places. The number of the material introduction ports 44 provided in the flat screw 40 is not limited to three. In the flat screw 40, the material introduction port 44 may be provided at only one place, or may be provided at two or more places.

Figure 4:
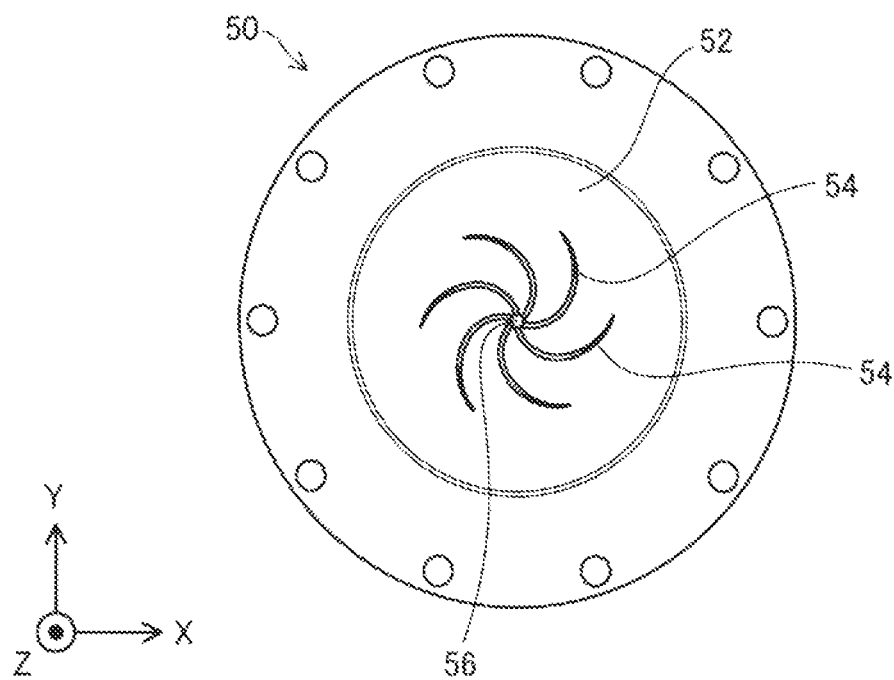
FIG. 4 is a top view showing a configuration of a barrel on a screw facing surface side.

FIG. 4 is a top view showing the configuration of the barrel 50 on the screw facing surface 52 side. As described above, the communication hole 56 communicating with the nozzle 65 is formed at a center of the screw facing surface 52. A plurality of guide grooves 54 are formed around the communication hole 56 in the screw facing surface 52. One end of the guide groove 54 is coupled to the communication hole 56, and extends spirally from the communication hole 56 toward an outer periphery of the screw facing surface 52. The guide groove 54 has a function of guiding the shaping material to the communication hole 56. In order to make the shaping material reach the communication hole 56 efficiently, the guide groove 54 is preferably formed in the barrel 50, but the guide groove 54 may not be formed in the barrel 50.

Figure 5:
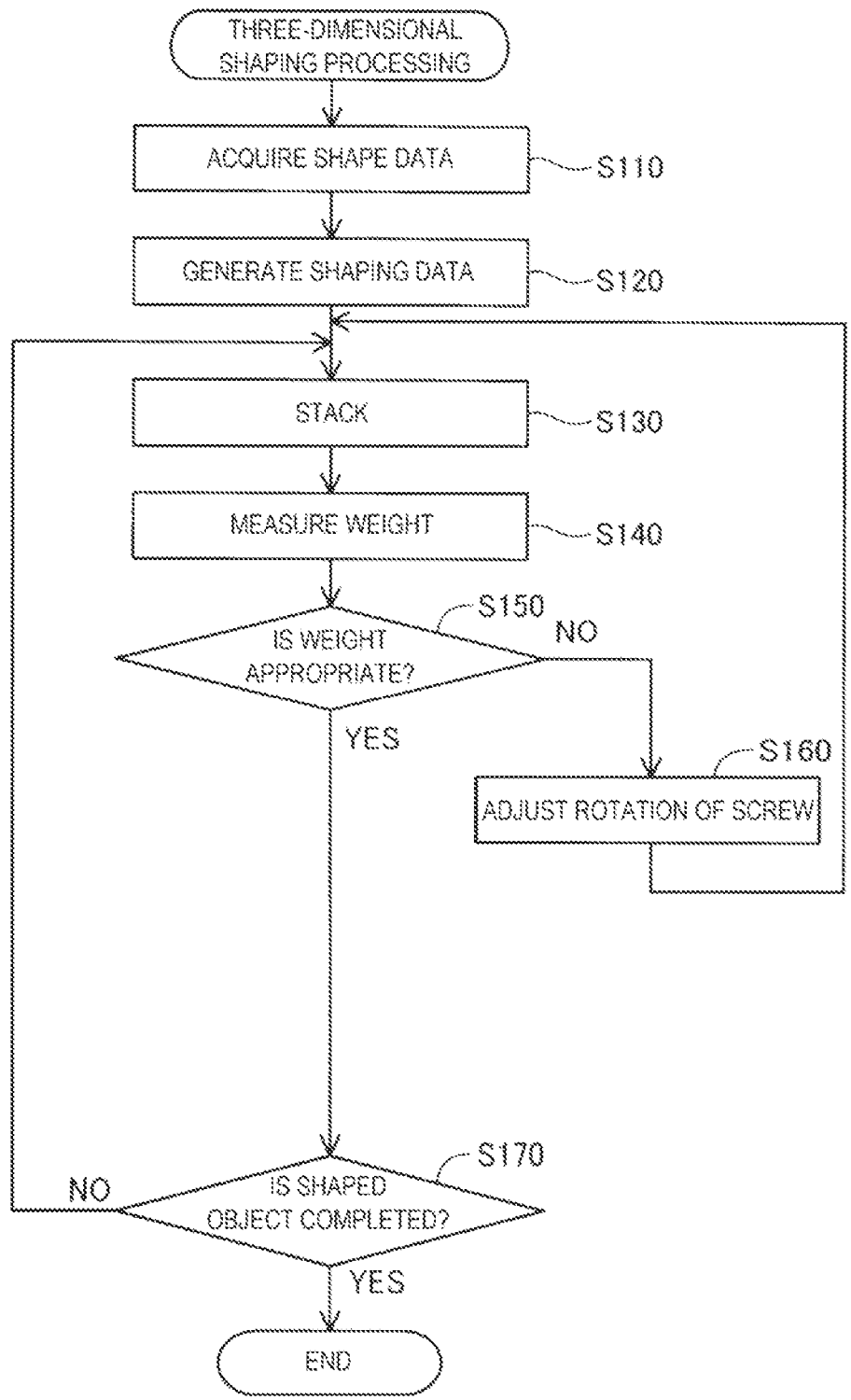
FIG. 5 is a process diagram showing a shaping processing of a three-dimensional shaped object according to the first embodiment.

FIG. 5 is a process diagram showing a three-dimensional shaping processing for implementing a method for manufacturing a three-dimensional shaped object according to the present embodiment. The control unit 700 executes the three-dimensional shaping processing when a predetermined start operation is performed by the user on an operation panel provided in the three-dimensional shaping device 100 or a computer coupled to the three-dimensional shaping device 100. By executing the three-dimensional shaping processing, the three-dimensional shaping device 100 starts to shape the three-dimensional shaped object. In the three-dimensional shaping processing, the control unit 700 controls the discharge unit 200 and the weight measuring unit 500 to stack layers of the shaping material in a shaping region of the stage 300 to shape the three-dimensional shaped object. The three-dimensional shaping processing may be simply referred to as a shaping processing.

In step S110, the control unit 700 acquires shape data. For example, the control unit 700 reads the shape data representing a shape of the three-dimensional shaped object created using three-dimensional CAD software or three-dimensional CG software from a computer coupled to the three-dimensional shaping device 100 or a recording medium such as a USB memory.

In step S120, the control unit 700 generates shaping data. The control unit 700 divides the three-dimensional shaped object based on the shape data into layers having a predetermined thickness to generate the shaping data.

In step S130, the control unit 700 controls the discharge unit 200 and the moving mechanism 400 to stack layers of the shaping material on the stage 300. Specifically, according to the shaping data, the control unit 700 controls the rotation speed of the flat screw 40 to adjust the amount of the shaping material to be discharged from the nozzle 65 while appropriately controlling the moving mechanism 400 to move the discharge unit 200, and discharges the shaping material from the nozzle 65 toward the shaping region of the stage 300, so as to stack layers of the shaping material. The shaping region refers to a region on the stage 300 in which the three-dimensional shaped object is to be shaped.

In step S140, the control unit 700 controls the weight measuring unit 500 to measure a first weight, which is the weight of the shaping material discharged to the shaping region in step S130. In the present embodiment, the control unit 700 measures the first weight by the weight measuring unit 500 each time one path is shaped. The path is a path in which the discharge unit 200 moves while discharging the shaping material continuously. In another embodiment, the first weight may not be measured each time one path is shaped. For example, the first weight may be measured each time a single layer of the three-dimensional shaped object or a plurality of layers is shaped, or the first weight may be measured at a predetermined time.

In step S150, the control unit 700 determines whether the weight of the shaping material is appropriate. Specifically, the control unit 700 determines whether a predetermined amount of the shaping material is discharged from the discharge unit 200 based on the first weight. In the present embodiment, the control unit 700 compares the first weight with a second weight calculated from the shape data acquired in step S110. The control unit 700 determines that the weight of the shaping material is appropriate when the first weight and the second weight match, and determines that the weight of the shaping material is not appropriate when the first weight and the second weight do not match. That is, in the present embodiment, the "predetermined amount" can also be said to be an amount of the shaping material of the second weight. As the second weight, for example, a weight obtained by multiplying a volume of the three-dimensional shaped object based on the shape data by a density of the shaping material can be used. In the present embodiment, since the control unit 700 measures the weight of the shaping material for each path, a weight of a portion corresponding to the path out of the three-dimensional shaped object based on the shape data is calculated as the second weight. "Match" refers to that a plurality of values match within a predetermined error range.

The control unit 700 may record a result of determining whether a predetermined amount of the shaping material is discharged from the discharge unit 200. For example, when the first weight is insufficient with respect to the second weight in a certain path, it may be recorded as presence or absence of a gap in the path. In addition, a ratio of the first weight to the second weight for each path may be recorded as shaping density. For example, the user may evaluate shaping accuracy of the completed three-dimensional shaped object based on these records.

When it is determined in step S150 that the weight of the shaping material is not appropriate, in step S160, the control unit 700 adjusts the rotation speed of the flat screw 40 provided in the plasticization unit 30. For example, when the first weight is less than the second weight, the control unit 700 controls the drive motor 32 to increase the rotation speed of the flat screw 40. Thereafter, the processing returns to step S130, and the control unit 700 stacks the shaping material while controlling the rotation speed of the flat screw 40 based on the processing of step S160.

When it is determined in step S150 that the weight of the shaping material is appropriate, in step S170, the control unit 700 determines whether the three-dimensional shaped object is completed. When the control unit 700 determines that the three-dimensional shaped object is completed, the three-dimensional shaping processing is ended. When it is determined that the three-dimensional shaped object is not completed, the processing returns to step S130, and the control unit 700 continues stacking the shaping material. The control unit 700 completes the three-dimensional shaped object by repeating the processing from step S130 to step S170 until the three-dimensional shaped object is completed.

According to the three-dimensional shaping device of the present embodiment described above, the control unit 700 determines whether a predetermined amount of the shaping material is discharged from the discharge unit 200 based on the weight measured by the weight measuring unit 500, and when it is determined that the predetermined amount of the shaping material is not discharged, controls the discharge unit 200 so that the predetermined amount of the shaping material is discharged from the discharge unit 200. Therefore, it is possible to prevent generation of a gap in the shaped object, an increase in a line width of the material to be discharged, and the like, and to improve the shaping accuracy.

In the present embodiment, the control unit 700 measures the weight of the shaping material discharged to the shaping region by the weight measuring unit 500 while discharging the shaping material from the discharge unit 200 to the shaping region, and when it is determined that the predetermined amount of the shaping material is not discharged, controls the discharge unit 200 so that the predetermined amount of the shaping material is discharged from the discharge unit 200, and shapes the three-dimensional shaped object by discharging the shaping material from the discharge unit 200 to the shaping region. Accordingly, since it is repeatedly determined whether the predetermined amount of the shaping material is discharged, the shaping accuracy of the three-dimensional shaped object is further improved.

In the present embodiment, the control unit 700 compares a weight calculated from the shape data representing the shape of the three-dimensional shaped object and the weight measured by the weight measuring unit 500 to determine whether the predetermined amount of the shaping material is discharged. Therefore, it is possible to reduce a difference that occurs between the three-dimensional shaped object based on the shape data and the three-dimensional shaped object actually shaped.

In the present embodiment, the control unit 700 controls the rotation speed of the flat screw 40 provided in the plasticization unit 30 to adjust the amount of the shaping material to be discharged from the discharge unit 200. Therefore, the amount of the shaping material to be discharged from the discharge unit 200 can be adjusted with a simple configuration.

Here, a material of the three-dimensional shaped object used in the three-dimensional shaping device 100 described above will be described. The three-dimensional shaping device 100 can use various materials such as a material having thermoplasticity, a metal material, and a ceramic material as a main material to shape the three-dimensional shaped object. Here, the "main material" means a central material for forming a shape of the three-dimensional shaped object, and a material occupying a content of 50% by weight or more in the three-dimensional shaped object. The above shaping materials include those in which main materials are melted alone, and those in which some of the components contained together with the main materials are melted to form a paste.

When the material having thermoplasticity is used as the main material, a shaping material is generated by plasticizing the material in the plasticization unit 30.

For example, the following thermoplastic resin materials can be used as the material having thermoplasticity.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyetheretherketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone An additive such as a wax, a flame retardant, an antioxidant, and a heat stabilizer, and the like in addition to a pigment, a metal, and a ceramic may be mixed to the material having thermoplasticity. The material having thermoplasticity is plasticized by the rotation of the flat screw 40 and the heating of the heater 58 and is then converted into a melted state in the plasticization unit 30. After the shaping material generated by melting the material having thermoplasticity is discharged from the nozzle 65, the shaping material is cured due to a reduction in temperature.

It is desirable that the material having thermoplasticity is injected from the nozzle 65 in a state where the material is heated to a temperature equal to or higher than a glass transition point thereof and is then in a completely melted state. For example, when an ABS resin is used, it is desirable that the temperature of the material having thermoplasticity is about 200° C. when discharged from the nozzle 65.

The following metal materials, for example, may be used as the main material in the three-dimensional shaping device 100 instead of the above material having thermoplasticity. In this case, it is desirable that a component to be melted at the time of generating the shaping material is mixed with a powder material obtained by converting the following metal material into powder, and then the mixture is charged into the plasticization unit 30 as the material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy A ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When a metal material or a ceramic material as described above is used as the main material, the shaping material discharged onto the stage 300 may be cured by sintering.

The powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20 as the material MR. A solvent can be used alone or in combination of two or more types selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged to the material supply unit 20 as the material MR.

Example of Binder

Figure 6:
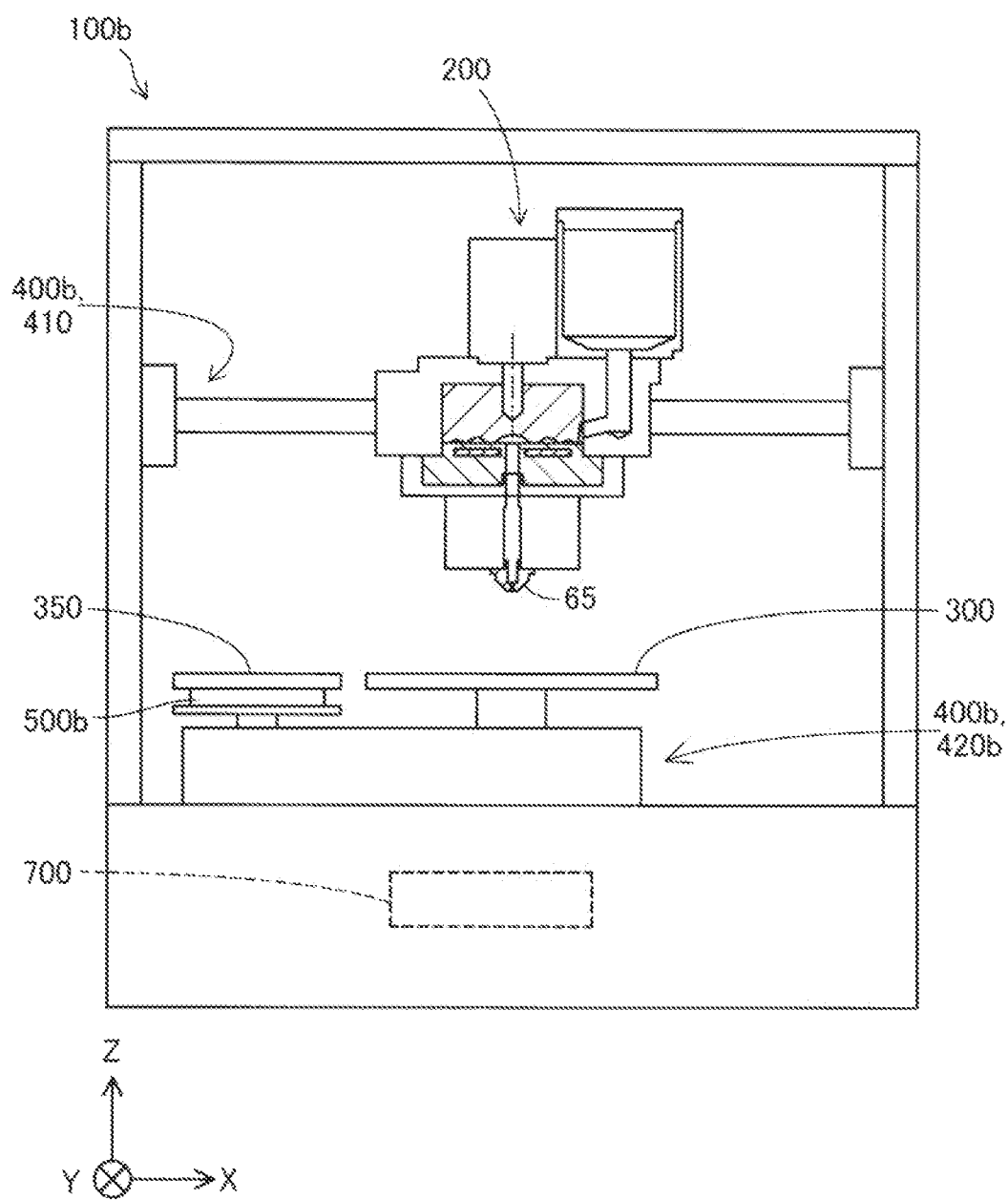
FIG. 6 is a diagram showing a schematic configuration of a three-dimensional shaping device according to a second embodiment.

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins B. Second Embodiment FIG. 6 is a diagram showing a schematic configuration of a three-dimensional shaping device 100b according to a second embodiment. Unlike the three-dimensional shaping device 100 of the first embodiment, the three-dimensional shaping device 100b includes a table 350 in a region different from the shaping region. A part of configurations of a moving mechanism 400b and a weight measuring unit 500b is different from that of the first embodiment. A portion not specifically described in the three-dimensional shaping device 100b has similar configuration as that of the first embodiment.

The table 350 has a flat plate shape extending in a direction along the XY plane. In the present embodiment, the table 350 may face the discharge unit 200 and is disposed at a position that does not overlap the stage 300. The shaping material is discharged from the discharge unit 200 on the table 350 in a first cleaning processing to be described later. The table 350 may have any other shape as long as the shaping material can be retained on the table 350, and may be, for example, a box shape with an opening in a +Z direction.

The weight measuring unit 500 of the first embodiment supports the stage 300 from below the stage 300, and measures the weight of the shaping material on the stage 300. In contrast, the weight measuring unit 500b of the second embodiment supports the table 350 from below the table 350, and measures the weight of the shaping material on the table 350. That is, in the present embodiment, the weight measuring unit 500b does not measure the weight of the shaping material on the stage 300. The weight measuring unit 500b is implemented by a load cell type weight sensor, and does not include the heat insulating unit 520 or the support unit 530.

The second moving mechanism 420b of the second embodiment is configured to move the table 350 in the Z direction in addition to the stage 300. The stage 300 and the table 350 move at the same time by the drive force of one motor. In another embodiment, the weight measuring unit 500b may be configured to measure both the shaping material on the stage 300 and the shaping material on the table 350. The second moving mechanism 420b may be configured to move the stage 300 and the table 350 independently of each other.

Figure 7:
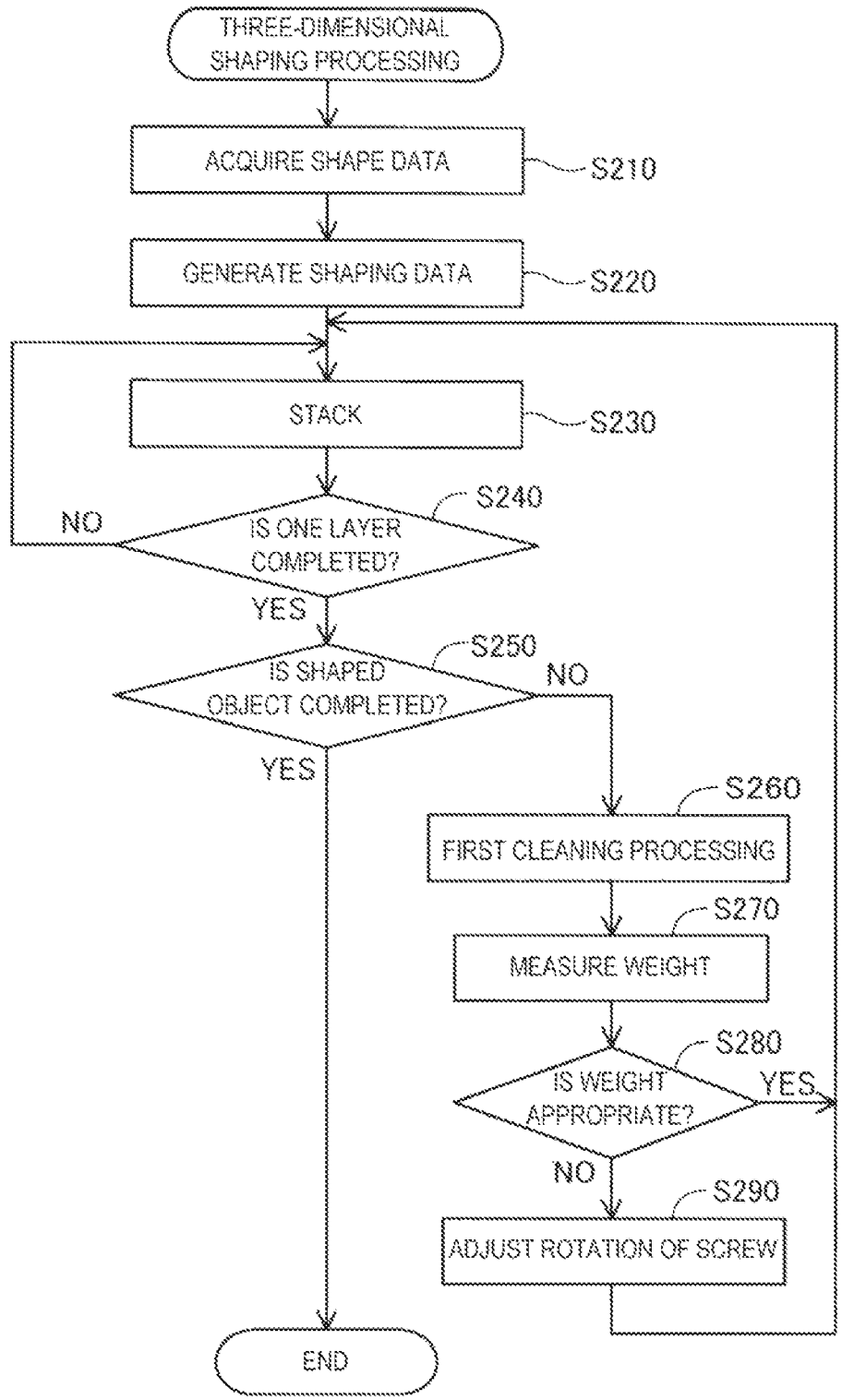
FIG. 7 is a process diagram showing a shaping processing of a three-dimensional shaped object according to the second embodiment.

FIG. 7 is a process diagram showing a shaping processing of the three-dimensional shaped object for implementing the method for manufacturing a three-dimensional shaped object according to the second embodiment. Since the processes from step S210 to step S230 are similar as those from step S110 to step S130 in the first embodiment shown in FIG. 5, a description thereof is omitted.

In step S240, the control unit 700 determines whether one layer of the three-dimensional shaped object is completed. When the control unit 700 determines that one layer is not completed, the processing returns to step S230, and the control unit 700 continues stacking the shaping material.

When it is determined in step S240 that one layer of the three-dimensional shaped object is completed, in step S250, the control unit 700 determines whether the three-dimensional shaped object is completed. When the control unit 700 determines that the three-dimensional shaped object is completed, the three-dimensional shaping processing is ended.

When it is determined in step S250 that the three-dimensional shaped object is not completed, the control unit 700 executes the first cleaning processing in step S260. Specifically, first, the control unit 700 controls the moving mechanism 400 to position the discharge unit 200 above the table 350. Thereafter, the control unit 700 discharges the shaping material from the discharge unit 200 toward the table 350, and cleans an inside of the discharge unit 200. In the first cleaning processing, the control unit 700 controls the discharge unit 200 so that a predetermined amount of shaping material is discharged from the discharge unit 200. The first cleaning processing refers to a processing of cleaning the discharge unit 200 by causing the control unit 700 to discharge the shaping material from the discharge unit 200 onto the table 350 in a predetermined period before or during the three-dimensional shaping processing.

In step S270, the control unit 700 measures the weight of the shaping material discharged onto the table 350 in the first cleaning processing of step S260 by the weight measuring unit 500b.

In step S280, the control unit 700 determines whether the weight of the shaping material is appropriate. The control unit 700 determines that the weight of the shaping material is appropriate when a third weight of the shaping material measured by the weight measuring unit 500b in step S270 and a fourth weight of the shaping material assumed to be discharged from the discharge unit 200 in the first cleaning processing match, and determines that the weight of the shaping material is not appropriate when the third weight and the fourth weight do not match. When the control unit 700 determines that the weight of the shaping material is appropriate, the processing returns to step S230, and the control unit 700 continues stacking the shaping material.

When it is determined in step S280 that the weight of the shaping material is not appropriate, the control unit 700 adjusts the rotation speed of the flat screw 40 provided in the plasticization unit 30. For example, when the third weight is less than the fourth weight, the control unit 700 controls the drive motor 32 to increase the rotation speed of the flat screw 40. Thereafter, the processing returns to step S230, and the control unit 700 stacks the shaping material while controlling the rotation speed of the flat screw 40 based on the processing of step S280.

The processing from step S260 to step S290 may be repeatedly executed. For example, in order to effectively clean the inside of the discharge unit 200, the processing from step S260 to step S290 may be repeated twice or more times.

Also in the three-dimensional shaping device 100b of the second embodiment described above, it is possible to prevent the generation of the gap in the shaped object, the increase in the line width of the material to be discharged, and the like, and to improve the shaping accuracy. In particular, in the present embodiment, it is possible to determine whether the predetermined amount of the shaping material is discharged based on the weight of the shaping material discharged to a region different from the shaping region, and control the discharge unit 200 so that the predetermined amount of the shaping material is discharged from the discharge unit 200 to the shaping region.

In the present embodiment, in the first cleaning processing, the control unit 700 determines whether a predetermined amount of the shaping material is discharged based on the weight of the shaping material discharged onto the table 350. Therefore, it is possible to determine whether a predetermined amount of the shaping material is being discharged while cleaning the discharge unit 200.

In the present embodiment, the control unit 700 performs the first cleaning processing each time a layer of the three-dimensional shaped object is stacked in the shaping region. Therefore, it is possible to clean the discharge unit 200 each time the layer is stacked and determine whether a predetermined amount of the shaping material is discharged each time the layer is stacked.

C. Third Embodiment

Figure 8:
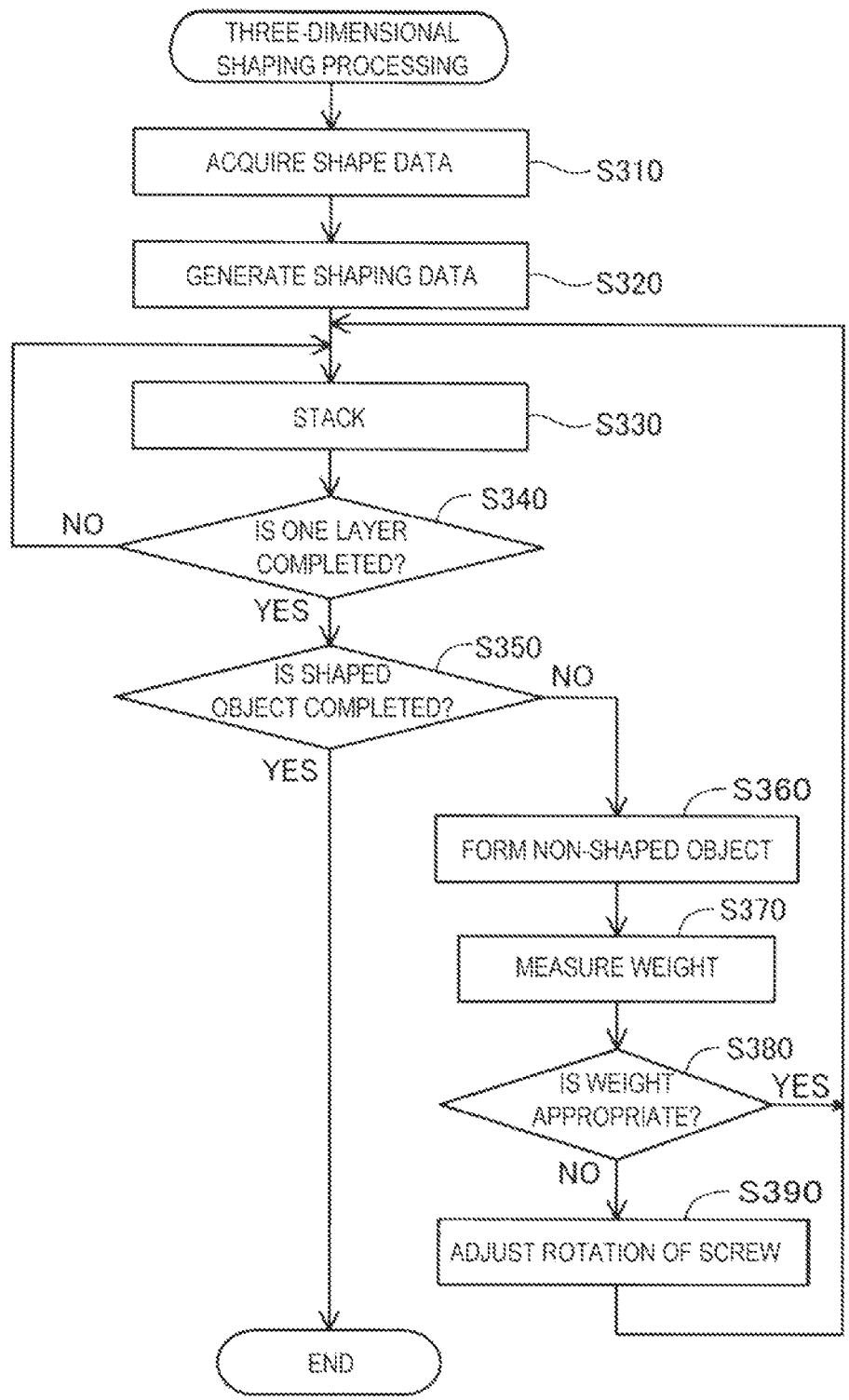
FIG. 8 is a process diagram showing a shaping processing of a three-dimensional shaped object according to a third embodiment.

FIG. 8 is a process diagram showing a shaping processing of the three-dimensional shaped object for implementing the method for manufacturing a three-dimensional shaped object according to a third embodiment. Since the configuration of the three-dimensional shaping device 100 according to the third embodiment is similar to that of the first embodiment, a description thereof is omitted. Since the processes from step S310 to step S350 are similar as those from step S210 to step S250 in the second embodiment shown in FIG. 7, a description thereof is omitted.

Figure 9:
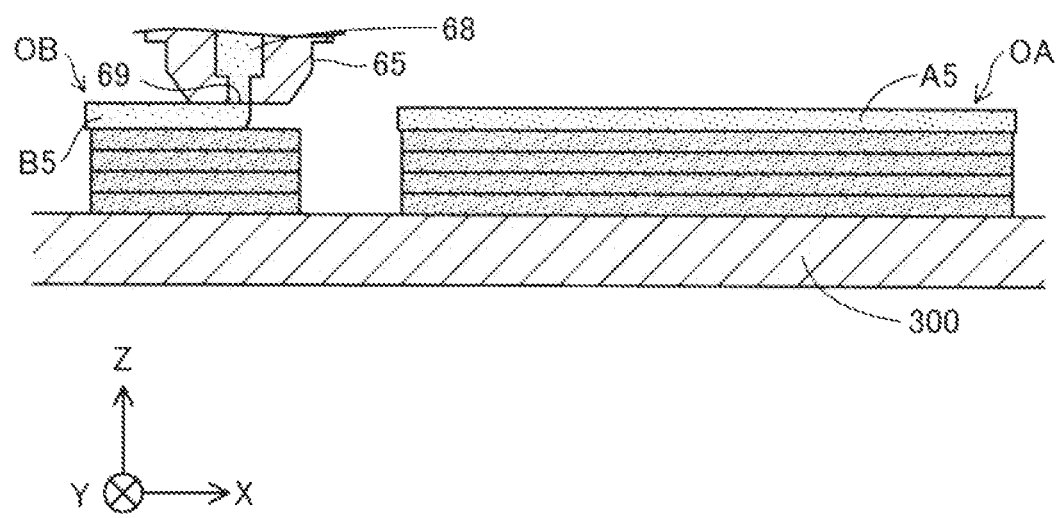
FIG. 9 is a schematic diagram showing a three-dimensional shaping processing according to the third embodiment.

FIG. 9 is a schematic diagram showing a three-dimensional shaping processing according to the third embodiment. FIG. 9 shows a state in which a three-dimensional shaped object OA is shaped in the shaping region of the stage 300 and a non-shaped object OB is shaped in a region different from the shaping region of the stage 300. When it is determined in step S350 that the three-dimensional shaped object OA is not completed, the control unit 700 forms the non-shaped object OB in step S360.

Specifically, in step S360, the control unit 700 discharges the shaping material from the discharge unit 200 to a region different from the shaping region and forms the non-shaped object OB in the region different from the shaping region in at least a part of a period until the shaping material forming the layer of the three-dimensional shaped object OA is solidified. Accordingly, the discharge of the shaping material on a non-solidified layer of the three-dimensional shaped object OA is prevented, and thus the shaping accuracy of the three-dimensional shaped object OA can be improved. Further, since the shaping material is discharged from the discharge unit 200 during the period until the three-dimensional shaped object OA is solidified, stagnation of the shaping material in the discharge unit 200 is prevented. The term "solidification" refers to that the shaping material discharged from the discharge unit 200 loses fluidity. In the present embodiment, the shaping material loses plasticity and solidifies upon cooling.

Details of step S360 will be described with reference to FIG. 9. FIG. 9 shows the three-dimensional shaped object OA whose fifth layer A5 is stacked, and the non-shaped object OB whose fifth layer B5 is being stacked. At this time, the shaping material forming the fifth layer A5 of the three-dimensional shaped object OA is being solidified. That is, the fifth layer B5 of the non-shaped object OB is formed during a period in which the fifth layer A5 of the three-dimensional shaped object OA is solidified. First to fourth layers of the non-shaped object OB are also formed during respective periods in which first to fourth layers of the three-dimensional shaped object OA solidify. When sixth and subsequent layers of the three-dimensional shaped object OA are shaped, sixth and subsequent layers of the non-shaped object OB are similarly formed.

In the present embodiment, the control unit 700 forms the non-shaped object OB having a predetermined shape in step S360. Therefore, the control unit 700 can calculate the weight of the shaping material assumed to be required to form one layer of the non-shaped object OB and the entire non-shaped object OB. Specifically, the non-shaped object OB is formed in a substantially quadrangular columnar shape having a height substantially equal to that of the three-dimensional shaped object OA during shaping. The non-shaped object OB formed in the substantially columnar shape by stacking the shaping materials is sometimes referred to as a prime pillar. The non-shaped object OB may have another shape. For example, it may be a substantially columnar prime pillar or may not have a substantially columnar shape.

In step S370, the control unit 700 measures the weight of the shaping material discharged to a region different from the shaping region in step S360 by the weight measuring unit 500.

In step S380, the control unit 700 determines whether the weight of the shaping material is appropriate. In the present embodiment, the control unit 700 determines that the weight of the shaping material is appropriate when a fifth weight of the shaping material measured by the weight measuring unit 500b in step S370 and a sixth weight of the shaping material assumed to be discharged from the discharge unit 200 in step S360 match, and determines that the weight of the shaping material is not appropriate when the fifth weight and the sixth weight do not match. When the control unit 700 determines that the weight of the shaping material is appropriate, the processing returns to step S330, and the control unit 700 continues stacking the shaping material.

When it is determined in step S380 that the weight of the shaping material is not appropriate, the control unit 700 adjusts the rotation speed of the flat screw 40 provided in the plasticization unit 30. For example, when the fifth weight is less than the sixth weight, the control unit 700 controls the drive motor 32 to increase the rotation speed of the flat screw 40. Thereafter, the processing returns to step S330, and the control unit 700 stacks the shaping material while controlling the rotation speed of the flat screw 40 based on the processing of step S380.

When it is determined in step S350 that the three-dimensional shaped object OA is not completed, the processing from step S360 to step S390 may be repeatedly executed. For example, the control unit 700 can adjust the amount of the shaping material discharged from the discharge unit 200 while forming the non-shaped object OB by repeating step S370 to step S390 during a period in which one layer of the non-shaped object OB is formed in step S360.

Also in the three-dimensional shaping device 100 of the third embodiment described above, it is possible to prevent the generation of the gap in the shaped object, the increase in the line width of the material to be discharged, and the like, and to improve the shaping accuracy. In particular, in the present embodiment, it is possible to determine whether a predetermined amount of the shaping material is discharged based on the weight of the shaping material discharged from the discharge unit 200 when the shaping material forming the layer of the three-dimensional shaped object OA is solidified.

In the present embodiment, each time a layer of the three-dimensional shaped object OA is shaped, the weight of the shaping material discharged from the discharge unit 200 in a region different from the shaping region is measured by the weight measuring unit 500. Therefore, it is possible to determine whether a predetermined amount of the shaping material is discharged each time the layer is stacked.

D. Fourth Embodiment

Figure 10:
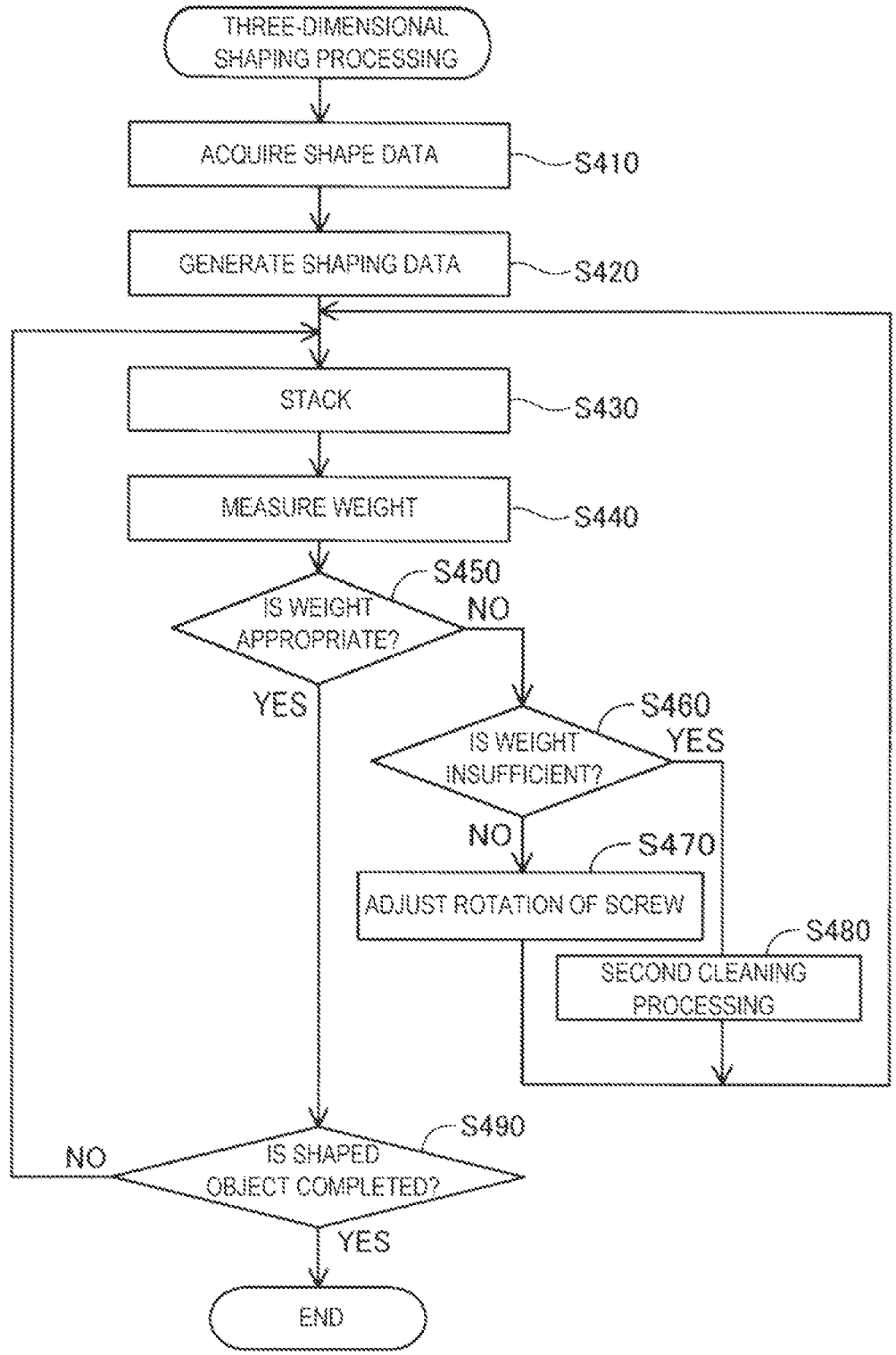
FIG. 10 is a process diagram showing a shaping processing of a three-dimensional shaped object according to a fourth embodiment.

FIG. 10 is a process diagram showing a shaping processing of the three-dimensional shaped object for implementing the method for manufacturing a three-dimensional shaped object according to a fourth embodiment. Since the configuration of the three-dimensional shaping device 100 according to the fourth embodiment is similar to that of the first embodiment, a description thereof is omitted. Since the processes from step S410 to step S450 are similar as those from step S110 to step S150 in the first embodiment shown in FIG. 5, a description thereof is omitted.

When it is determined in step S450 that the weight of the shaping material is not appropriate, in step S460, the control unit 700 determines whether the weight of the shaping material is insufficient. A state in which the "weight of the shaping material is insufficient" refers to a state in which the amount of the shaping material discharged from the discharge unit 200 is less than the predetermined amount. Specifically, when the first weight of the shaping material measured by the weight measuring unit 500 in step S440 is lower than the second weight calculated from the shape data, the control unit 700 determines that the weight of the shaping material is insufficient.

When it is determined in step S460 that the weight of the shaping material is not insufficient, in step S470, the control unit 700 adjusts the rotation speed of the flat screw 40 provided in the plasticization unit 30. In this case, in the present embodiment, since the first weight is larger than the second weight, the control unit 700 controls the drive motor 32 to decrease the rotation speed of the flat screw 40. Thereafter, the processing returns to step S430, and the control unit 700 stacks the shaping material while controlling the rotation speed of the flat screw 40 based on the processing of step S470.

When it is determined in step S460 that the weight of the shaping material is insufficient, in step S480, the control unit 700 executes a second cleaning processing. Specifically, first, the control unit 700 controls the moving mechanism 400 to position the discharge unit 200 above a region different from the shaping region of the stage 300. Thereafter, the control unit 700 discharges the shaping material from the discharge unit 200 toward the region different from the shaping region, and cleans the inside of the discharge unit 200. The second cleaning processing refers to a processing of cleaning the discharge unit 200 by discharging the shaping material from the discharge unit 200 to the region different from the shaping region when the control unit 700 determines that the amount of the shaping material is less than a predetermined amount. Thereafter, the processing returns to step S430, and the control unit 700 stacks the shaping material.

Also in the three-dimensional shaping device 100 of the fourth embodiment described above, it is possible to prevent the generation of the gap in the shaped object, the increase in the line width of the material to be discharged, and the like, and to improve the shaping accuracy. In particular, in the present embodiment, when it is determined that the amount of the shaping material discharged from the discharge unit 200 is less than a predetermined amount, the second cleaning processing is executed. Accordingly, the shaping material stagnating in the discharge unit 200 can be discharged to the outside of the discharge unit 200, and the amount of the shaping material discharged from the discharge unit 200 can be increased to be close to the predetermined amount.

E. Fifth Embodiment

Figure 11:
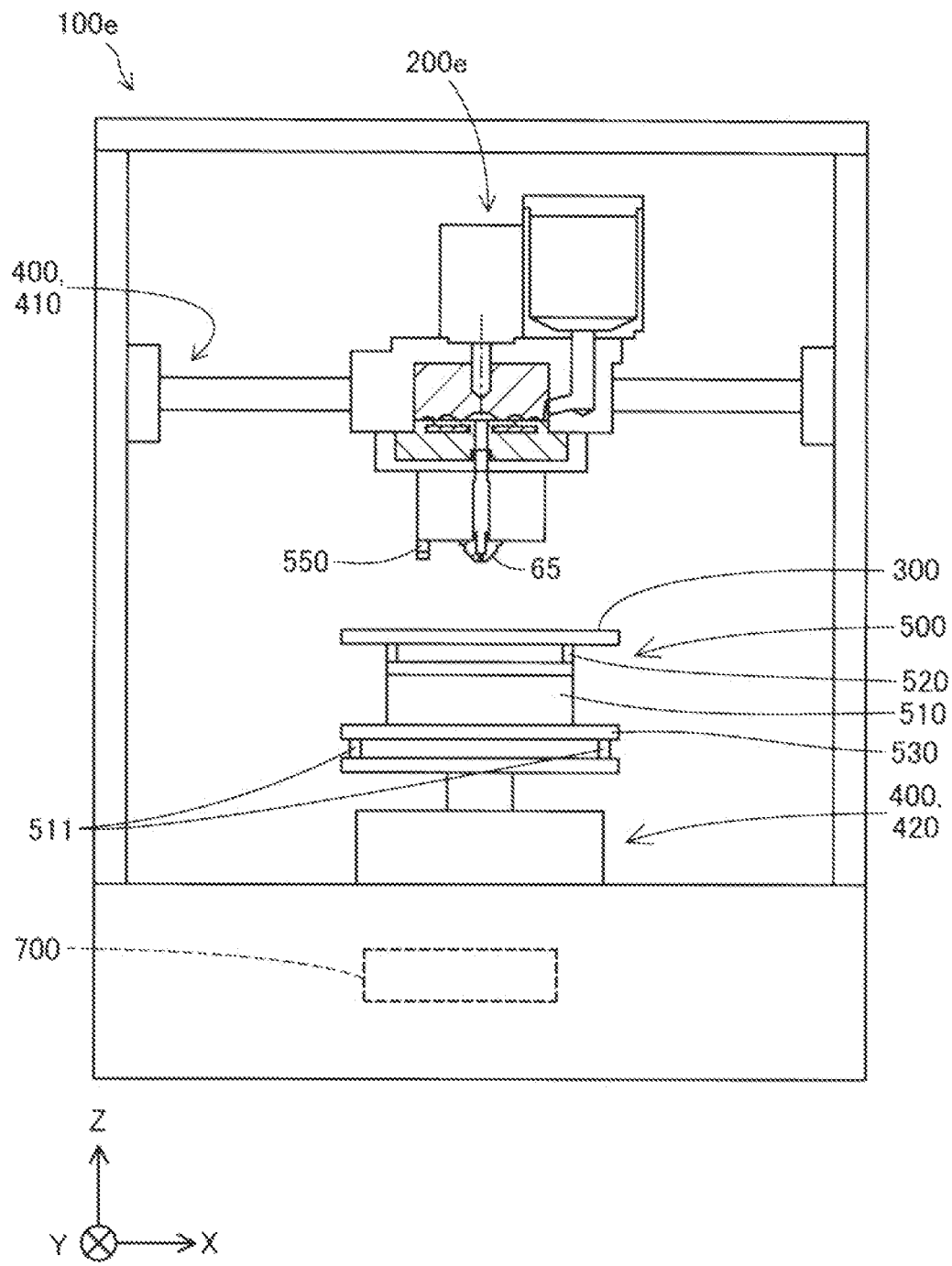
FIG. 11 is a diagram showing a schematic configuration of a three-dimensional shaping device according to a fifth embodiment.

FIG. 11 is a diagram showing a schematic configuration of a three-dimensional shaping device 100e according to a fifth embodiment. Unlike the three-dimensional shaping device 100 of the first embodiment, the three-dimensional shaping device 100e includes a line width measuring unit 550.

The line width measuring unit 550 measures a line width of the shaping material discharged from the discharge unit 200. In the present embodiment, the line width measuring unit 550 is provided below the barrel 50 in a discharge unit 200e. The line width measuring unit 550 includes a laser oscillating portion and a laser light receiving portion. The line width measuring unit 550 measures the line width of the shaping material by emitting a laser toward the shaping material discharged to the shaping region on the stage 300 and receiving the emitted laser. The line width of the shaping material is a length of the shaping material discharged from the nozzle hole 69 in a direction intersecting a scanning direction of the discharge unit 200e. The scanning direction of the discharge unit 200e refers to a direction in which the discharge unit 200e moves while discharging the shaping material. Specifically, the line width measuring unit 550 measures the line width of the shaping material by scanning with the emitted laser in the direction intersecting the scanning direction while emitting the laser to the shaping material.

For example, by performing the line width measurement by the line width measuring unit 550 after the weight measurement by the weight measuring unit 500, the control unit 700 can spatially detect a state of the three-dimensional shaped object and further improve the shaping accuracy of the three-dimensional shaped object. In another embodiment, the control unit 700 may measure the line width a predetermined number of times at a predetermined time during the three-dimensional shaping processing, and record a result of the line width measurement for each measurement. In this case, for example, the user may evaluate the shaping accuracy of the completed three-dimensional shaped object based on the recorded line width. In addition, the gap generated in the three-dimensional shaped object being shaped or the shaping density may be recorded.

Also in the three-dimensional shaping device 100e of the fifth embodiment described above, it is possible to prevent the generation of the gap in the shaped object, the increase in the line width of the material to be discharged, and the like, and to improve the shaping accuracy. In particular, in the present embodiment, by measuring the line width of the shaping material by the line width measuring unit 550, it is possible to further improve the shaping accuracy of the three-dimensional shaped object.

F. Sixth Embodiment

Figure 12:
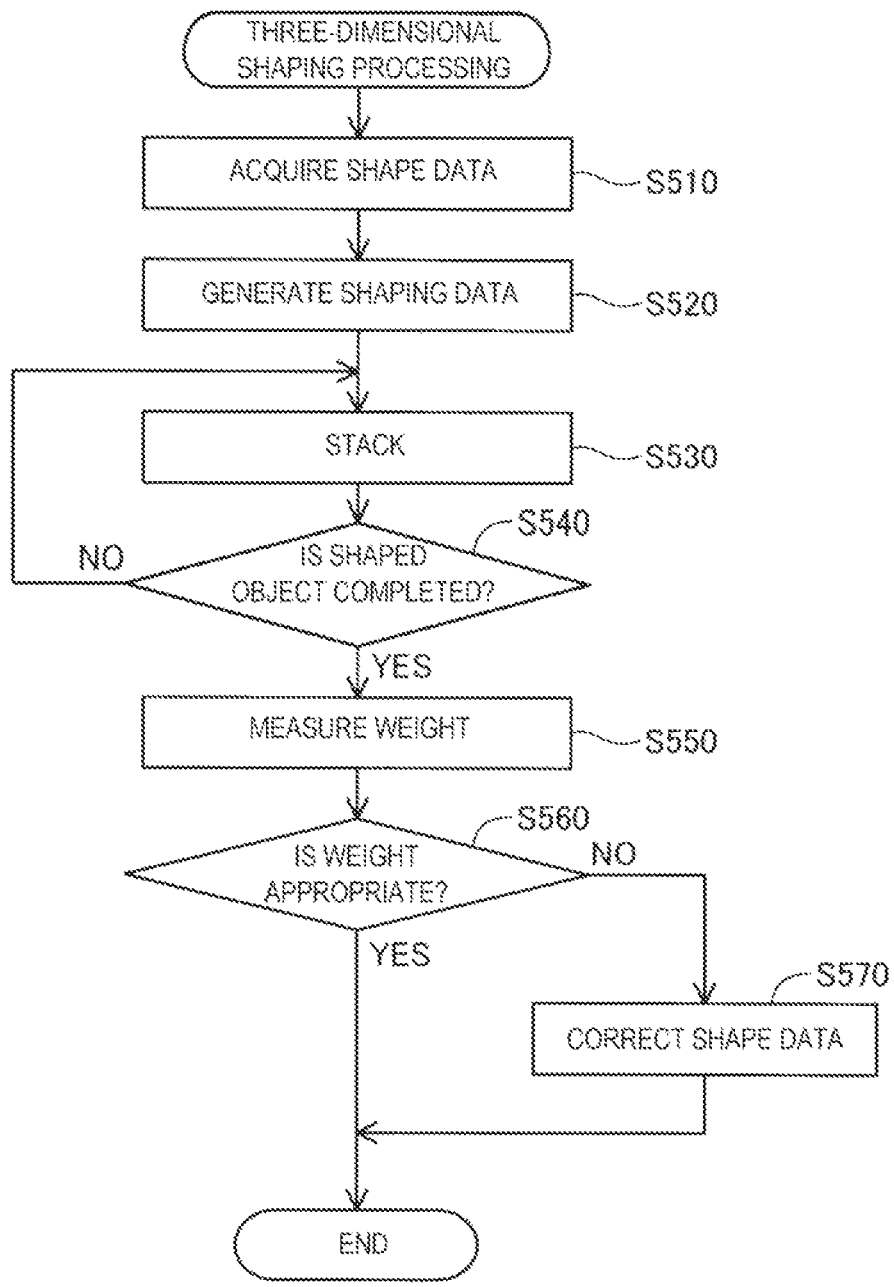
FIG. 12 is a process diagram showing a shaping processing of a three-dimensional shaped object according to a sixth embodiment.

FIG. 12 is a process diagram showing a shaping processing of the three-dimensional shaped object according to a sixth embodiment. Since the configuration of the three-dimensional shaping device 100 according to the sixth embodiment is similar to that of the first embodiment, a description thereof is omitted. Since the processes from step S510 to step S530 are similar as those from step S110 to step S130 in the first embodiment shown in FIG. 5, a description thereof is omitted.

In step S540, the control unit 700 determines whether the three-dimensional shaped object is completed. When it is determined that the three-dimensional shaped object is not completed, the processing returns to step S530, and the control unit 700 continues stacking the shaping material.

When it is determined in step S540 that the three-dimensional shaped object is completed, in step S550, the control unit 700 measures a seventh weight of the shaping material discharged to the shaping region of the stage 300 by the weight measuring unit 500. That is, in step S540, the weight of the completed three-dimensional shaped object is measured as the seventh weight.

In step S560, the control unit 700 determines whether the weight is appropriate. In the present embodiment, the control unit 700 compares the seventh weight with an eighth weight calculated from the data acquired in step S510. The control unit 700 determines that the weight of the shaping material is appropriate when the seventh weight and the eighth weight match, and determines that the weight of the shaping material is not appropriate when the seventh weight and the eighth weight do not match. That is, in the present embodiment, the "predetermined amount" can also be said to be an amount of the shaping material of the eighth weight. As the eighth weight, a weight obtained by multiplying the volume of the three-dimensional shaped object based on the shape data by the density of the shaping material can be used. In the present embodiment, the weight of the shaping material assumed to be discharged when the three-dimensional shaped object based on the shape data is completed is calculated. When the control unit 700 determines in step S560 that the weight is appropriate, the three-dimensional shaping processing is ended.

When it is determined in step S560 that the weight is not appropriate, in step S570, the control unit 700 corrects the shape data. Specifically, the control unit 700 corrects the shape data based on the seventh weight and the eighth weight. For example, the control unit 700 calculates a ratio of the eighth weight to the seventh weight, multiplies height data of the three-dimensional shaped object included in the shape data before correction by the calculated ratio, and corrects the height data of the three-dimensional shaped object included in the shape data. Accordingly, the corrected shape data is generated. Thereafter, the control unit 700 ends the three-dimensional shaping processing.

The control unit 700 can use the corrected shape data when a three-dimensional shaping processing for shaping a three-dimensional shaped object same as the three-dimensional shaped object shaped by the three-dimensional shaping processing is newly started after the three-dimensional shaping processing is ended. That is, the control unit 700 can generate the corrected shaping data based on the corrected shape data, and can shape the three-dimensional shaped object by controlling the discharge unit 200 based on the corrected shaping data. Accordingly, it is possible to improve the accuracy of the three-dimensional shaped object to be shaped. The corrected shaping data may be data generated by correcting a part of the shaping data, or may be data newly generated based on the corrected shape data.

Also in the three-dimensional shaping device 100 of the sixth embodiment described above, it is possible to prevent the generation of the gap in the shaped object, the increase in the line width of the material to be discharged, and the like, and to improve the shaping accuracy. In particular, in the present embodiment, by controlling the discharge unit 200 based on the corrected shaping data generated based on the corrected shape data, it is possible to improve the shaping accuracy with simple control.

After the three-dimensional shaping processing is ended, a three-dimensional shaping processing for shaping a new three-dimensional shaped object different from the three-dimensional shaped object shaped by the three-dimensional shaping processing may be newly started. In this case, for example, in step S510, the control unit 700 acquires shape data of the three-dimensional shaped object to be shaped by the new three-dimensional shaping processing, in addition to the shape data of the three-dimensional shaped object shaped by the three-dimensional shaping processing. Further, in step S570, for example, the control unit 700 calculates a ratio of the eighth weight to the seventh weight, multiplies height data included in the shape data before correction of the new three-dimensional shaped object by the calculated ratio, and corrects the height data included in the shape data. Accordingly, the shape data of the new three-dimensional shaped object is corrected based on the seventh weight and the eighth weight. Thereafter, by controlling the discharge unit 200 based on the corrected shaping data generated based on the corrected shape data by the control unit 700, it is possible to improve the shaping accuracy of the new three-dimensional shaped object with simple control. The control unit 700 may not acquire the shape data of the new three-dimensional shaped object in step S510, but may acquire the shape data immediately before correcting the shape data in step S570, for example.

For example, as in the first embodiment, the shape data can be corrected based on the first weight and the second weight even in a form in which the weight measuring unit 500 measures the weight of the shaping material discharged to the shaping region during shaping of the three-dimensional shaped object. For example, the control unit 700 calculates a ratio of the second weight to the first weight, multiplies height data of the three-dimensional shaped object included in the shape data before correction by the calculated ratio, and corrects the height data of the three-dimensional shaped object included in the shape data. Accordingly, the corrected shape data is generated. Thereafter, the control unit 700 controls the discharge unit 200 based on the corrected shaping data to stack the shaping material, thereby shaping the three-dimensional shaped object. Thus, even when the three-dimensional shaped object is shaped while the control unit 700 corrects the shape data, it is possible to improve the shaping accuracy of the three-dimensional shaped object.

G. Other Embodiments (G-1) In the above embodiment, the control unit 700 compares the first weight measured by the weight measuring unit 500 with the second weight calculated from the shape data, and determines whether a predetermined amount of the shaping material is discharged. In contrast, for example, the control unit 700 may compare the first weight and a weight calculated from the shaping data to determine whether a predetermined amount of the shaping material is discharged.

(G-2) In the above embodiment, the control unit 700 generates the shaping data. In contrast, the control unit 700 may not generate the shaping data. In this case, the control unit 700 may not acquire the shape data. For example, slicer software may read the shape data and generate the shaping data based on the shape data. Further, a data processing device provided separately from the control unit 700 may acquire the shape data and generate the shaping data. In this case, the control unit 700 acquires the shaping data generated by the slicer software or the data processing device.

(G-3) In the above embodiment, the control unit 700 performs the first cleaning processing each time a layer of the three-dimensional shaped object is stacked. In contrast, the control unit 700 may perform the first cleaning processing, for example, before starting the three-dimensional shaping processing.

(G-4) In the above embodiment, the control unit 700 measures the weight of the non-shaped object OB by the weight measuring unit 500 each time one layer of the three-dimensional shaped object is stacked. In contrast, the weight of the non-shaped object OB may not be measured each time one layer of the three-dimensional shaped object OA is stacked. For example, the weight of the non-shaped object OB may be measured each time two layers of the three-dimensional shaped object OA are stacked. In this case, the control unit 700 forms one layer of the non-shaped object OB each time one layer of the three-dimensional shaped object OA is stacked, and measures the weight of the non-shaped object OB each time two layers of the non-shaped object OB are formed.

(G-5) In the above embodiment, the control unit 700 forms the non-shaped object OB in a region different from the shaping region on the stage 300. In contrast, the non-shaped object OB may be formed in a region other than the stage 300 such as the table 350 of the second embodiment, and the weight of the shaping material discharged to the region may be measured by the weight measuring unit 500.

(G-6) In the above embodiment, the plasticization unit 30 includes the flat screw 40. In contrast, the plasticization unit 30 may include another screw instead of the flat screw 40. For example, the plasticization unit 30 may include an in-line screw.

(G-7) In the above embodiment, the three-dimensional shaping device 100 includes the plasticization unit 30. In contrast, the three-dimensional shaping device 100 may not include the plasticization unit 30. For example, the three-dimensional shaping device 100 may be an inkjet device that discharges a liquid as a shaping material onto a stage while controlling liquid droplets to stack the liquid. In this case, for example, the control unit 700 may control a piezoelectric body that controls the liquid droplets to change a dot size of a liquid droplet to be discharged and control the amount of the shaping material to be discharged. In this case, the shaping material is solidified by, for example, evaporation of water contained in the liquid or volatilization of volatile components.

(G-8) In the above embodiment, the line width measuring unit 550 measures the line width of the shaping material discharged to the shaping region. In contrast, the line width measuring unit 550 may measure the line width of the shaping material discharged to a region different from the shaping region. For example, the line width of the shaping material discharged to a region different from the shaping region of the stage 300 may be measured. As in the second embodiment, when the table 350 to which the shaping material is to be retained on a top is provided, the line width of the shaping material discharged onto the table 350 may be measured.

(G-9) In the above embodiment, the line width measuring unit 550 measures the line width of the shaping material discharged from the discharge unit 200e by using a laser. In contrast, the line width measuring unit 550 may be, for example, a measuring device including a camera that captures an image. In this case, for example, the line width measuring unit 550 may measure the line width of the shaping material by analyzing the captured image.

H. Other Aspects

The present disclosure is not limited to the embodiments described above, and can be implemented in various forms without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. If the technical characteristics are not described as essential in the present description, they can be deleted as appropriate.

(1) According to a first aspect of the present disclosure, a three-dimensional shaping device is provided. The three-dimensional shaping device includes: a discharge unit configured to discharge a shaping material; a weight measuring unit configured to measure a weight of the shaping material discharged from the discharge unit; and a control unit configured to control the discharge unit and the weight measuring unit to shape a three-dimensional shaped object by stacking layers of the shaping material in a shaping region of a stage. The control unit is configured to control the weight measuring unit to measure the weight of the shaping material discharged from the discharge unit, determine whether a predetermined amount of the shaping material is discharged from the discharge unit based on the weight measured by the weight measuring unit, and when it is determined that the predetermined amount of the shaping material is not discharged, control the discharge unit so that the predetermined amount of the shaping material is discharged from the discharge unit.

According to such an aspect, it is possible to prevent generation of a gap in the shaped object, an increase in a line width of the discharged material, and the like, and to improve shaping accuracy.

(2) In the three-dimensional shaping device according to the above aspect, the control unit may measure the weight of the shaping material discharged to the shaping region by the weight measuring unit while discharging the shaping material from the discharge unit to the shaping region, and when it is determined that the predetermined amount of the shaping material is not discharged, control the discharge unit so that the predetermined amount of the shaping material is discharged from the discharge unit, and shape the three-dimensional shaped object by discharging the shaping material from the discharge unit to the shaping region. According to such an aspect, since it is repeatedly determined whether the predetermined amount of the shaping material is discharged, the shaping accuracy of the three-dimensional shaped object is further improved.

(3) In the three-dimensional shaping device according to the above aspect, the weight measuring unit may measure the weight of the shaping material discharged from the discharge unit to the shaping region, and the control unit may compare a weight calculated from shape data representing a shape of the three-dimensional shaped object and the weight measured by the weight measuring unit, so as to determine whether the predetermined amount of the shaping material is discharged. According to such an aspect, it is possible to reduce a difference that occurs between the three-dimensional shaped object based on the shape data and the three-dimensional shaped object actually shaped.

(4) In the three-dimensional shaping device according to the above aspect, the control unit may control the discharge unit based on shaping data generated from the shape data, and when it is determined that the predetermined amount of the shaping material is not discharged, correct the shape data based on the weight measured by the weight measuring unit and the weight calculated from the shape data, correct the shaping data based on the corrected shape data, and control the discharge unit so that the predetermined amount of the shaping material is discharged from the discharge unit based on the corrected shaping data. According to such an aspect, it is possible to improve the shaping accuracy with simple control.

(5) In the three-dimensional shaping device according to the above aspect, the weight measuring unit may measure a weight of the shaping material discharged from the discharge unit to a region different from the shaping region, and the control unit may discharge the shaping material from the discharge unit to the region different from the shaping region, and determine whether the predetermined amount of the shaping material is discharged from the discharge unit based on the weight of the shaping material discharged to the region different from the shaping region. According to such an aspect, it is possible to determine whether the predetermined amount of the shaping material is discharged to the region different from the shaping region, and control the discharge unit so that the predetermined amount of the shaping material is discharged to the shaping region.

(6) The three-dimensional shaping device according to the above aspect may further include a table in a region different from the shaping region, in which the weight measuring unit may measure a weight of the shaping material discharged from the discharge unit onto the table, and the control unit may perform a first cleaning processing of cleaning the discharge unit by discharging the shaping material from the discharge unit onto the table, and determine whether the predetermined amount of the shaping material is discharged based on the weight of the shaping material discharged onto the table in the first cleaning processing. According to such an aspect, it is possible to determine whether the predetermined amount of the shaping material is being discharged while cleaning the discharge unit.

(7) In the three-dimensional shaping device according to the above aspect, the control unit may perform the first cleaning processing each time the layer is stacked in the shaping region. According to such an aspect, it is possible to clean the discharge unit each time the layer is stacked, and to determine whether the predetermined amount of the shaping material is discharged each time the layer is stacked.

(8) In the three-dimensional shaping device according to the above aspect, the control unit may discharge the shaping material from the discharge unit to the region different from the shaping region in at least a part of a period until the shaping material forming the layer is solidified each time the layer is shaped in the shaping region. According to such an aspect, it is possible to determine whether the predetermined amount of the shaping material is discharged based on the weight of the shaping material discharged from the discharge unit while the shaping material forming the layer is solidified.

(9) In the three-dimensional shaping device according to the above aspect, the control unit may measure, by the weight measuring unit, a weight of the shaping material discharged from the discharge unit to the region different from the shaping region each time the layer is shaped. According to such an aspect, it is possible to determine whether the predetermined amount of the shaping material is discharged each time the layer is stacked.

(10) In the three-dimensional shaping device according to the above aspect, when it is determined that an amount of the shaping material discharged from the discharge unit is less than the predetermined amount, the control unit may perform a second cleaning processing of cleaning the discharge unit by discharging the shaping material from the discharge unit to a region different from the shaping region. According to such an aspect, the shaping material stagnating in the discharge unit can be discharged to the outside of the discharge unit, and the amount of the shaping material discharged from the discharge unit can be increased to be close to the predetermined amount.

(11) In the three-dimensional shaping device according to the above aspect, the discharge unit may include a plasticization unit configured to plasticize a material and generate the shaping material, the plasticization unit may include a screw, and the control unit may control a rotation speed of the screw to adjust an amount of the shaping material to be discharged from the discharge unit. According to such an aspect, the amount of the shaping material discharged from the discharge unit can be adjusted with a simple configuration.

(12) The three-dimensional shaping device according to the above aspect may further include a line width measuring unit configured to measure a line width of the discharged shaping material. According to such an aspect, it is possible to further improve the shaping accuracy of the three-dimensional shaped object.

The present disclosure is not limited to the three-dimensional shaping device described above, and can be implemented in various modes. For example, the present disclosure can be implemented in an aspect of a method for manufacturing a three-dimensional shaped object, a method for controlling a three-dimensional shaping device, a computer program for shaping the three-dimensional shaped object, and a non-transitory tangible recording medium in which the computer program is recorded.

What is claimed is:

1. A three-dimensional shaping device comprising:
  a discharge head configured to discharge a shaping material to a shaping region on a stage to form a layer and discharge the shaping material into a box to clean the discharge head as a cleaning process, the stage and the box being configured to move independently;
  a line width measuring device attached to the discharge head, the line width measuring device being configured to measure a line width of the layer, the line width measuring device including a laser scanner scanning with a laser beam across the layer or a camera capturing an image of the layer;
  a weight measuring device configured to measure a weight of the shaping material on the shaping region on the stage discharged from the discharge head, the weight measuring device being disposed directly under the stage, the weight measuring device being configured with:
    a support; and
    a weight sensor stacked on the support, the stage and the box being stacked on the weight sensor;
  a memory configured to store a program; and
  a processor configured to execute the program so as to:
    read shaping data generated from shape source data, the shape source data representing a shape of a three-dimensional shaped object;
    cause the discharge head to discharge the shaping material to form the three-dimensional shaped object by executing the shaping data;
    cause the weight measuring device to measure the weight of a first part on the shaping region, the first part being formed by executing at least a part of the shaping data;
    calculate a first weight from the shape source data or the shaping data corresponding to the first part;
    compare between the weight of the first part measured by the weight measuring device and the calculated first weight to generate a comparison result,
    determine whether one layer of the three-dimensional shaped object is completed;
    cause the discharge head to move above the box and discharge the shaping material into the box as the cleaning process when the processor determines that the one layer of the three-dimensional shaped object is completed;
    cause the weight measuring device to measure the weight in the box;
    determine whether the measured weight of the shaping material in the box is a predetermined value so as to output a determination result;
    control the discharge head based on the comparison result, the determination result, and the measured line width,
  wherein the discharge head includes a plasticization member configured to plasticize a source material and generate the shaping material,
  the plasticization member includes a screw, and
  the processor is configured to control a rotation speed of the screw to adjust an amount of the shaping material to be discharged from the discharge head.

2. The three-dimensional shaping device according to claim 1,
  wherein the processor is configured to cause the weight measuring device to measure the weight of the first part on the shaping region while the processor causes the discharge head to discharge the shaping material to the shaping region on the stage.

3. The three-dimensional shaping device according to claim 1,
  wherein the processor is configured to determine that a predetermined amount of the shaping material corresponding to the first part is not discharged from the discharge head to the shaping region on the stage based on the comparison result,
  the processor is configured to correct the shape source data so as to provide corrected shape source data when the processor determines that the predetermined amount of the shaping material corresponding to the first part is not discharged from the discharge head to the shaping region on the stage,
  the processor is configured to generate corrected shaping data by correcting the shaping data based on the corrected shape source data, and
  the processor is configured to cause the discharge head to discharge the shaping material to form the three-dimensional shaped object by executing the corrected shaping data.

4. The three-dimensional shaping device according to claim 1,
  wherein the processor is configured to determine that a predetermined amount of the shaping material corresponding to the first part is not discharged from the discharge head to the shaping region on the stage based on the comparison result, and
  the processor is configured to perform the cleaning process for cleaning the discharge head when the processor determines that the predetermined amount of the shaping material corresponding to the first part is not discharged from the discharge head to the shaping region on the stage.

* * * * *